Patented Feb. 4, 1941

2,230,931

UNITED STATES PATENT OFFICE 2,230,931

COMPOSITION FOR AND METHOD OF EXTENDING THE LIFE OF CUT FLOWERS

William J. Bussert, Maywood, Ill.

Application August 30, 1939, Serial No. 292,641

10 Claims. (Cl. 71—2)

This invention relates to a composition for and to a method of extending the life of cut flowers.

It has heretofore been proposed to add sugar to the water in which cut flowers are kept for the purpose of nourishing the flowers and prolonging their life. The addition of sugar, alone, however, is not sufficient, since there are other factors than the lack of nourishment that cause cut flowers to wilt or droop and finally die. Enzymatic action and the action of fungi are also largely responsible for those changes in the composition and structure of the plant cells that result in the wilting of the flower and the shedding of its petals or leaves. To counteract the decomposition resulting from the action of enzymes, fungi, bacteria, and the like, it has been proposed to add an antiseptic to compositions for prolonging the life of cut flowers.

I have now found, however, that it is not sufficient merely to provide cut flowers with a nutrient in an aqueous medium containing an antiseptic. If the aqueous medium is alkaline in reaction, or even neutral, cut flowers placed therein respond only briefly to the nourishing action of the nutrient contained in the aqueous medium. On the other hand, if the aqueous medium is maintained distinctly on the acid side, preferably within the range of pH values of 4 to 6, the effectiveness of the aqueous solution of the nutrient is greatly increased. While I do not wish to be bound by any theory, I believe that this increase in effectiveness is in some way related to the fact that the sap, or other cell fluids, of the usual variety of flowering plants, have an acid pH. A great number of pH determinations run on many different varieties of cut flowers has revealed that the pH values run between 4.8 and 5.8, most generally within the narrower range of from 5 to 5.5.

Regardless of whether this may be the explanation, or not, for the increased effectiveness of an acid preparation for extending the life of cut flowers, I have found that by merely changing an alkaline or neutral aqueous sugar solution over to the acid side, the life of cut flowers may be extended two or even three times their length of life in the neutral or alkaline aqueous sugar solution, all other conditions being the same. It therefore seems to me reasonable to believe that there must exist a definite relationship of cause and effect in the action of an aqueous solution of a plant nutrient having an acid pH close to that of the plant itself upon the life of cut flowers placed in such aqueous nutrient.

It is therefore an important object of my invention to provide a composition for extending the life of cut flowers, the composition being capable when dissolved in water of forming a solution having an acid pH closely approximating the pH value of the saps, or cell fluids, of normally growing flowers.

It is a further important object of this invention to provide a dry mixture of a nutrient, such as a sugar, an acid substance and an antiseptic that is compatible with the acid substance in water solution at a pH of between 4 and 6.

It is a further important object of this invention to provide a method for prolonging the life of cut flowers wherein the cut flowers are subjected in their freshly cut condition to an aqueous medium having an acid pH closely approximating that of the flowers themselves and containing a nutrient that is readily assimilable by the flowers and an antiseptic to prevent decomposition and maintain the flowers in a natural, healthy state.

Other and further important objects of this invention will become apparent from the following description and appended claims.

The composition of my invention includes a water soluble, solid nutrient, which may suitably be a sugar, such as cane sugar, or one of the so-called simple sugars, chemically known as dextrose, levulose, mannose, galactose, and the like. I prefer to use commercial forms of cane sugar or dextrose, but any of the various sugars may be used with success.

The acid ingredient of my composition may be any water soluble, normally solid acid or acid reacting substance, capable in solution of giving a pH of between 4 and 6. Among the various acids and acid reacting substances that have been found suitable are the following:

Aluminum sulfate
Ammonium, sodium or potassium aluminum sulfate
Boric acid
Citric acid
Tannic acid
Tartaric acid
Sodium bisulfate
Sodium bisulfite
Sodium acid phosphate
Nickel chloride
Zinc chloride Owing to the fact that cut flowers are frequently placed in tinned receptacles while awaiting sale, it is preferable to use an acid substance that has a minimum amount of corroding action toward tin. It is naturally desirable also that the acid substance selected be of a non-poisonous character and relatively non-injurious to the hands. The acid substance that I have found which best answers these requirements is aluminum sulfate, preferably a relatively pure, iron free aluminum sulfate, such as is used in the making of high grade white paper.

Acids may be used, however, that would by themselves produce a too strongly acid solution, that is, one having a pH substantially below 4. In that case, it is merely necessary to add a buffering agent, such as sodium acetate, sodium citrate, or the like, in sufficient quantity to exert a buffering action and maintain the acidity of the aqueous solution within the desired pH limit.

In selecting the antiseptic for use in the composition of my invention, I prefer one that is normally a solid, that is not dangerously poisonous to human or animal life and that is compatible with the other ingredients of the composition in an aqueous solution having the desired degree of acidity. Antiseptics meeting these requirements include hexamethylenetetramine, and its water soluble salts and derivatives, oxyquinoline sulfate, acriflavine hydrochloride, proflavine, salts and esters of benzoic acids, particularly esters of parahydroxy benzoic acids, di-chlorsulfamino-benzoate of soda, and various others. Of these, I prefer to use either oxy-quinoline sulfate or hexamethylenetetramine. The former, being acid in constitution, is readily compatible with an acid aqueous solution of aluminum sulfate. While hexamethylenetetramine has an alkaline reaction, it is nevertheless capable of forming acid salts and is entirely stable in an aqueous solution of aluminum sulfate.

The following will serve as an example of the preferred range of proportions, expressed in parts by weight, of the various ingredients of my composition:

25 to 100 parts of oxy-quinoline sulfate, or
50 to 200 parts of hexamethylenetetramine
350 to 900 parts of aluminum sulfate
20,000 to 60,000 parts of sugar When a composition such as the above is dissolved in about 1,000,000 parts of water, the resulting aqueous solution has a pH within the range of from 4 to 6, and usually within the range of 4.5 to 5.5. In making up an aqueous solution from a composition containing either oxy-quinoline sulfate or hexamethylenetetramine, the corresponding number of milligrams of each of the ingredients may be weighed out and the ingredients added to one quart of water. In that case the total weight of the ingredients will be between about 20 and 60 grams, and since a quart of water weighs roughly 1,000 grams, the concentration will be between 2 and 6%, approximately, of the weight of the solution.

Instead of mixing the sugar directly with the other solid ingredients of my composition, I may furnish a mixture of the acid substance and antiseptic by themselves, and direct the purchaser to add to a solution of this mixture the required amount of sugar. My compositions may thus be marketed either with or without the sugar admixed therewith.

A preferred composition containing hexamethylenetetramine is the following:

|  | Parts |
|---|---|
| Hexamethylenetetramine | 120 |
| Aluminum sulfate | 750 |
| Sugar | 35,130 |

Converted into milligrams, the above parts by weight total 36 grams, which may conveniently be dissolved in one quart of water to give the desired concentration and degree of acidity.

In the case of a composition containing oxy-quinoline sulfate, the following is my preferred formula:

|  | Parts |
|---|---|
| Oxy-quinoline sulfate | 50 |
| Aluminum sulfate | 750 |
| Sugar | 35,200 |

Here again, if the parts by weight are converted into milligrams, the total weight of the composition will be 36 grams, a suitable quantity for dissolving in one quart of water.

The solution thus obtained represents a concentration of acid and antiseptic, exclusive of the sugar, of about 0.1% or less by weight. Aluminum sulfate in this concentration imparts to the solution an acidity represented by a pH between 4 and 6. A similar hydrogen ion concentration is generally obtained when using other acid substances in concentrations of about 0.1% by weight of solution, but, if necessary, buffering salts may be added to more strongly acid solutions to bring them within the desired range.

In using the composition of my invention, the composition is dissolved in the appropriate amount of water and the flowers, which preferably have just been freshly cut, are placed in the solution. Most flowers will be benefited by the use of the solution of my composition, but I have found such use particularly beneficial in the case of roses, carnations, larkspur, snapdragons, gysophila, zinnias, peonies, bouvardia, chrysanthemums, pompons, and asters. Where these flowers would, in general, last only two or three days at the most, the same flowers, when placed in a solution of my composition, will last two to three, or even more times as long. When subjected to the nourishing and antiseptic action of a solution of my composition, wilting of the flowers in warm rooms is prevented, and the fresh live color and fragrance of the flowers are maintained until the petals drop off.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. A dry, pulverulent composition for extending the life of cut flowers comprising a predominant amout of sugar, a water-soluble dry pulverulent acid substance selected from the group consisting of aluminum sulfate, ammonium, sodium, and potassium aluminum sulfates, boric acid, citric acid, tannic acid, tartaric acid, sodium bisulfate, sodium bisulfite, sodium acid phosphate, nickel chloride, and zinc chloride, and a separate antiseptic not dangerously poisonus to human life, said composition in concentrations of about 0.1 by weight in water forming a solution having a pH of from 4 to 6.

2. The method of prolonging the life of cut flowers, which comprises subjecting freshly cut flowers to the preserving and nourishing action of an aqueous solution of the following composition by weight:

|  | Parts | |
|---|---|---|
| Water | 1,000,000 | |
| Sugar | 20,000 to | 60,000 |
| Aluminum sulfate | 350 to | 900 |
| Hexamethylenetetramine | 50 to | 200 |

3. A composition for prolonging the life of cut flowers, comprising a predominant amount of sugar, aluminum sulfate and oxy-quinoline sulfate, all in dry solid form and all soluble in water to form in dilute concentrations a stable antiseptic solution having a pH between 4 and 6.

4. A composition for prolonging the life of cut flowers, comprising a predominant amount of sugar, aluminum sulfate and a separate antiseptic not dangerously harmful to human life, all in dry solid form and all soluble in water to form in dilute concentrations a stable antiseptic solution having a pH between 4 and 6.

5. A composition for prolonging the life of cut flowers, comprising a predominant amount of sugar, aluminum sulfate and hexamethylenetetramine, all in dry solid form and all soluble in water to form in dilute concentrations a stable antiseptic solution having a pH between 4 and 6.

6. A composition for prolonging the life of cut flowers, comprising a dry pulverulent mixture of 20,000 to 60,000 parts by weight of sugar, 350 to 900 parts by weight of aluminum sulfate and 50 to 200 parts by weight of hexamethylenetetramine.

7. The method of prolonging the life of cut flowers which comprises subjecting said cut flowers to the preserving action of an aqueous solution of active ingredients including a predominant amount of sugar, aluminum sulfate, and oxy-quinoline sulfate, said solution having a pH between 4 and 6.

8. A method of prolonging the life of cut flowers which comprises subjecting said cut flowers to the preserving action of an aqueous solution of active ingredients including a predominant amount of sugar, an acid substance selected from the group consisting of aluminum sulfate, ammonium, sodium, and potassium aluminum sulfates, boric acid, citric acid, tannic acid, tartaric aid, sodium bisulfate, sodium bisulfite, sodium acid phosphate, nickel chloride, and zinc chloride, and a separate antiseptic not dangerously harmful to human life, said solution having a pH between 4 and 6.

9. The method of prolonging the life of cut flowers which comprises subjecting said cut flowers to the preserving nourishing action of an aqueous solution of active ingredients including a predominant amount of sugar, aluminum sulfate, and a separate antiseptic not dangerously harmful to human life, said solution having a pH between 4 and 6.

10. A dry pulverulent composition for extending the life of cut flowers comprising a predominant amount of sugar, a water-soluble dry pulverulent acid substance selected from the group consisting of aluminum sulfate, ammonium, sodium, and potassium aluminum sulfates, boric acid, citric acid, tannic acid, tartaric acid, sodium bisulfate, sodium bisulfite, sodium acid phosphate, nickel chloride, and zinc chloride, and a separate organic antiseptic, said composition in concentrations of about 0.1% by weight in water forming a solution having a pH of from 4 to 6.

WILLIAM J. BUSSERT.